United States Patent [19]
Higuchi et al.

[11] Patent Number: 5,984,036
[45] Date of Patent: Nov. 16, 1999

[54] WORK MACHINE WITH OPERATOR'S CABIN

[75] Inventors: Takeshi Higuchi, Ishioka; Katsumi Miyaki, Chiyoda-machi, both of Japan

[73] Assignee: Hitachi Construction Machinery Co. Ltd., Tokyo, Japan

[21] Appl. No.: 08/983,260

[22] PCT Filed: May 29, 1997

[86] PCT No.: PCT/JP97/01833

§ 371 Date: Jan. 12, 1998

§ 102(e) Date: Jan. 12, 1998

[87] PCT Pub. No.: WO97/46766

PCT Pub. Date: Dec. 11, 1997

[30] Foreign Application Priority Data

Jun. 4, 1996 [JP] Japan ................................. 8-163912

[51] Int. Cl.⁶ ............................................ B62D 33/10
[52] U.S. Cl. .............................. 180/89.12; 296/190.01; 296/190.07
[58] Field of Search ................................ 180/89.1, 89.12, 180/89.13, 89.17, 89.19; 296/190.01, 190.07, 35.1

[56] References Cited

U.S. PATENT DOCUMENTS

| | | | |
|---|---|---|---|
| 5,498,060 | 3/1996 | Satomi | 296/190 |
| 5,520,259 | 5/1996 | Onohara et al. | 180/89.12 |

*Primary Examiner*—Paul N. Dickson
*Attorney, Agent, or Firm*—Antonelli, Terry, Stout & Kraus, LLP

[57] ABSTRACT

A rear side of an operator's cabin body is resiliently supported by a rubber mount, and a front side of the operator's cabin body is resiliently supported by a spring mount, of which a spring constant is set to be smaller than that of the rubber mount. Accordingly, a vibration transmissibility of pitching transmitted from a revolving frame to the operator's cabin body can be kept small, and pitching is damped by an oil damper which constitutes the rubber mount. Further, bounce and rolling transmitted to the operator's cabin body are converted into pitching for attenuation of vibration.

6 Claims, 12 Drawing Sheets

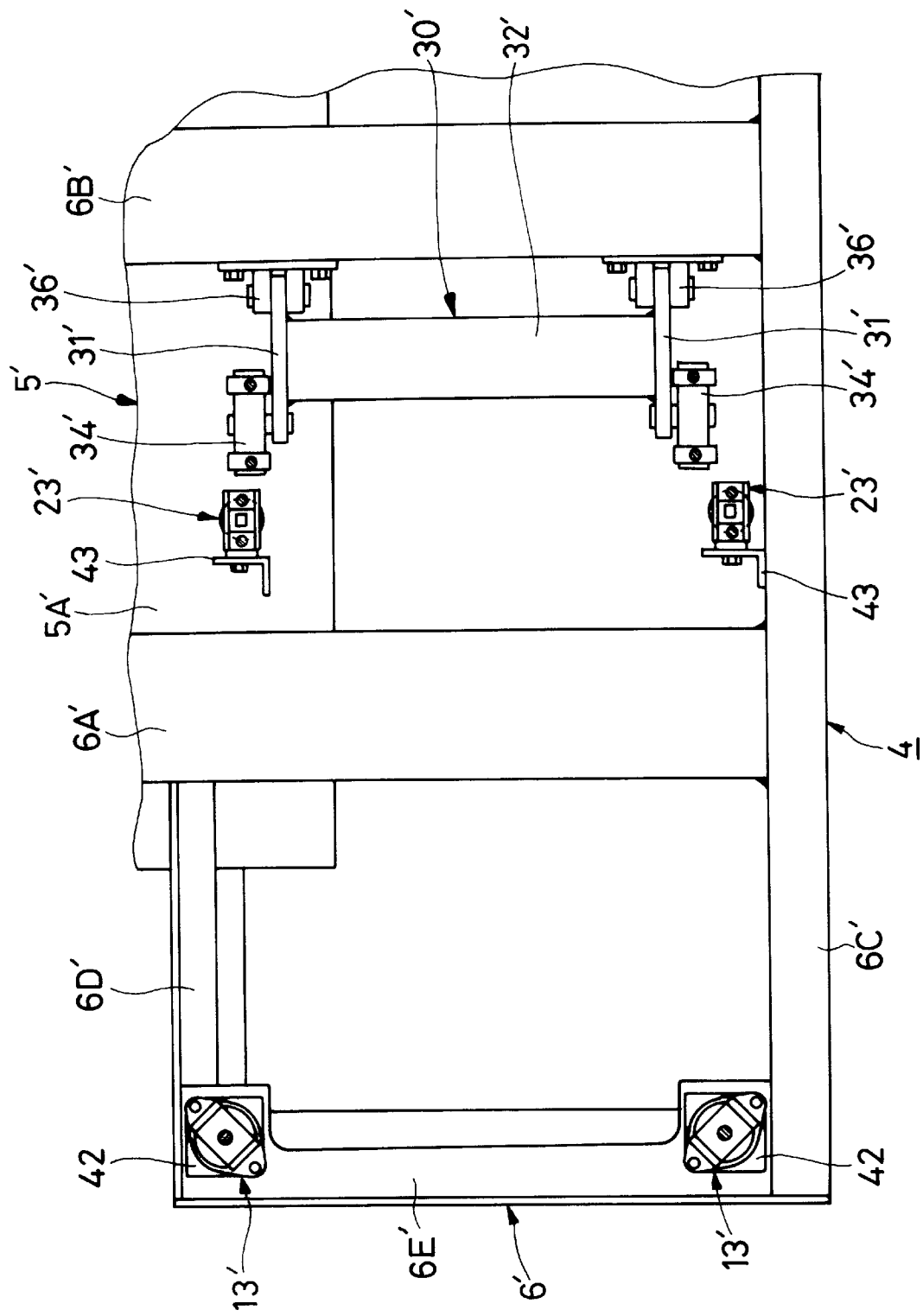

WORK MACHINE WITH OPERATOR'S CABIN

TECHNICAL FIELD

This invention relates to a working machine which is provided with an operator's cab, for example, like hydraulic power shovels, and more particularly to a working machine with an operator's cab, which is provided with means for damping transmission of vibrations from a working machine body to the operator's cab.

BACKGROUND OF THE INVENTION

Generally, in a working machines which is provided with an operator's cab, for example, as in the case of hydraulic power shovels or the like, a box-like body of an operator's cab is mounted on a support frame of a working machine body, and a cushioning support means is located between the box-like cab body and the support frame to damp transmission of vibrations from the support frame to the operator's cab. By suppressing transmission of vibrations to the cab body, including vibrational excavation reaction forces which occur during ground excavating operations and vibrations which occur while the machine is in travel on the ground surface, the cushioning support means of this sort contribute to prevent degradations in amenity of the operating space within the cab and in operationability on the control levers which are provided in the operator's cab.

As for conventional working machines of the sort which are equipped with an operator's cab, Japanese Laid-Open Patent Application H6-108493 discloses a hydraulic power shovel which is provided with a cushioning support means consisting of a combination of coil springs compressedly interposed between a support frame and a cab body and oil dampers each having upper and lower ends thereof connected to the cab body and support frame.

The prior art hydraulic power shovel just mentioned contemplates to lower the intrinsic vibration frequency of the cab body by setting a small spring constant for the coil springs and at the same time to lower the vibration transmission rate from the support frame to the cab body by suppressing the resonance through vibration attenuating actions of the oil dampers.

On the other hand, in order to cope with problems which would result from the use of coil springs with a small spring constant, that is to say, in order to prevent the operator's cab from being tilted to an excessively large degree in lateral directions or in forward and rearward directions on the support frame due to reductions in rigidity of the support against vibrations in sideward or lateral directions of the operator's cab (rolling) and against vibrations in forward and rearward directions (pitching), a parallel link mechanism containing torsion bars, is provided between the cab body and support frame thereby to connect them more rigidly.

Nevertheless, in the case of this prior art working machine with an operator's cab, the parallel link mechanism contributes to increase the rigidity of the operator's cab against rolling and pitching but as a result vibrations of the working machine can be more easily transmitted to the operator's cab during excavating operations or the like.

In this instance, the vibration attenuating characteristics of the oil dampers, which are employed for the cushioning support means, are determined in such a way as to balance with a small spring constant which is set for the coil springs. Therefore, the oil dampers can efficiently damp the transmission of vibrations to the operator's cab through the cushioning support means.

However, since neither the parallel link mechanism nor the torsion bars have functions to attenuate vibrations, it is difficult to damp the transmission of vibrations to the operator's cab by means of the parallel mechanism and torsion bars. Consequently, there still remains a problem that the cab body can be put in resonance on the support frame to deteriorate the amenity of the working space within the operator's cab as well as the operationability of control levers which are provided in the operator's cab.

DISCLOSURE OF THE INVENTION

In view of the above-mentioned problems of prior art working machines, it is an object of the present invention to provide a working machine with an operator's cab, which can efficiently damp transmission of vibrations from a support frame to the operator's cab to improve the amenity of the operator's cab to a marked degree.

In order to solve the above-mentioned problems, the present invention can be applied to a working machine which is provided with an operator's cab, and which basically includes a support frame, a cab body mounted on the support frame, and a cushioning support means provided between the cab body and the support frame to damp transmission of vibrations from the support frame to the cab body.

According to a feature of the construction employed by the present invention, the cushioning support means comprises: at least two units of a first anti-vibrational mount located in laterally spaced positions under either front or rear end portions of the cab body to support the cab body resiliently while attenuating vibrations thereof; a second anti-vibrational mount located under the opposite end portions of the cab body and having a spring member for resiliently supporting the cab body with a smaller spring constant than the first anti-vibrational mount and an oil damper for attenuating vibrations of the cab body.

In the case of the arrangements just described, the spring member of the second anti-vibrational mount is adapted to support the cab body resiliently with a spring constant smaller than that of the first anti-vibrational mount, for providing lower rigidity against forward and backward vibrations (pitching) of the cab body. Accordingly, it becomes possible to suppress the transmission rate of pitching vibrations from the support frame to the cab body, while attenuating pitching motions of the cab body by the oil damper of the second anti-vibrational mount.

Further, by resiliently supporting the cab body with the second anti-vibrational mount having a smaller spring constant than the first anti-vibrational mount, upward and downward vibrations (bouncing) of the cab body can be substantially converted into pitching movements about the first anti-vibrational mount and ultimately the pitching movements can be buffered by the second anti-vibrational mount.

Further, the above-mentioned first anti-vibrational mount functions to support lateral vibrations (rolling) of the cab body while attenuating its vibrations, thereby contributing to prevent resonance of the cab body as would normally be caused by rolling vibrations.

In this instance, the first and second anti-vibrational mounts of the cushioning support means may be located under rear and front end portions of the cab body, respectively.

Alternatively, the first and second anti-vibrational mounts of the cushioning support means may be located in inverse positions, namely, under front and rear end portions of the cab body, respectively.

In a preferred form of the invention, the first anti-vibrational mount which is located between the support frame and the cab body, is in the form of a liquid sealed-in type rubber mount internally holding a highly viscous liquid in a sealed state.

On the other hand, according to the present invention, it is preferred to provide a link mechanism located in the vicinity of the second anti-vibrational mount, the link mechanism being rotatably connected at one end thereof to the cab body and at the other end to the support frame to restrict sideward or lateral vibrations of the cab body on the support frame.

In the case of the arrangements just described, despite a drop in rigidity against rolling motions of the cab body, resulting from the use of the second anti-vibrational mount which is adapted to support the cab body resiliently with a smaller spring constant than the first anti-vibrational mount, the link mechanism which is located in the vicinity of the second anti-vibrational mount functions to restrict lateral vibrations of the cab body and to prevent same from being largely inclined in lateral directions.

In this instance, the above-mentioned link mechanism may be constituted by a pair of link members located in laterally spaced positions between the cab body and the support frame and each having one end thereof connected to the cab body and the other end to the support frame, a connecting member transversely connected between the link members, and a resilient bush inserted at the joint of each link member with at least either one of the cab body and the support frame.

In the case of the arrangements just described, the connecting member functions to restrict alternate upward and downward movements which would occur alternately and inversely to the two laterally spaced link members when the cab body is in rolling vibrations. As a consequence, the link mechanism contributes to compensate for the rigidity against rolling vibrations of the cab body. Besides, transmission of vibrations to the cab body through the link mechanism can be damped by the resilient bush members which are inserted at the joints of the link members with at least either the cab body or the support frame.

Further, in a preferred form of the invention, the first anti-vibrational mount is arranged to have a spring constant in the range of from $5 \times 10^5$ to $15 \times 10^5$ (N/m) and an attenuation coefficient in the range of from $1 \times 10^4$ to $2 \times 10^4$ (N·sec/m), while the second anti-vibrational mount is arranged to have a spring constant of said spring member in the range of from $4 \times 10^4$ to $10 \times 10^4$ (N/m) and an attenuation coefficient of said oil damper in the range of from $2 \times 10^3$ to $6 \times 10^3$ (N·sec/m).

BRIEF DESCRIPTION OF THE DRAWINGS

In the accompanying drawings:

FIG. 12 is a sectional view taken from the direction of arrows XII—XII of FIG. 11.

BEST MODE FOR CARRYING OUT THE INVENTION

Hereafter, the present invention is described more particularly by way of its preferred embodiments with reference to FIGS. 1 through 12 of the accompanying drawings.

Referring first to FIGS. 1 through 9, there is shown a first embodiment of the present invention, which is applied to a hydraulic power shovel.

In these figures, indicated at 1 is a base carrier, at 2 is a swing gear, and at 3 an upper revolving body which is rotatably mounted on the base carrier 1 through the swing gear 2. The upper revolving body 3 includes a revolving frame 4 as its bone structure.

Figure 1:
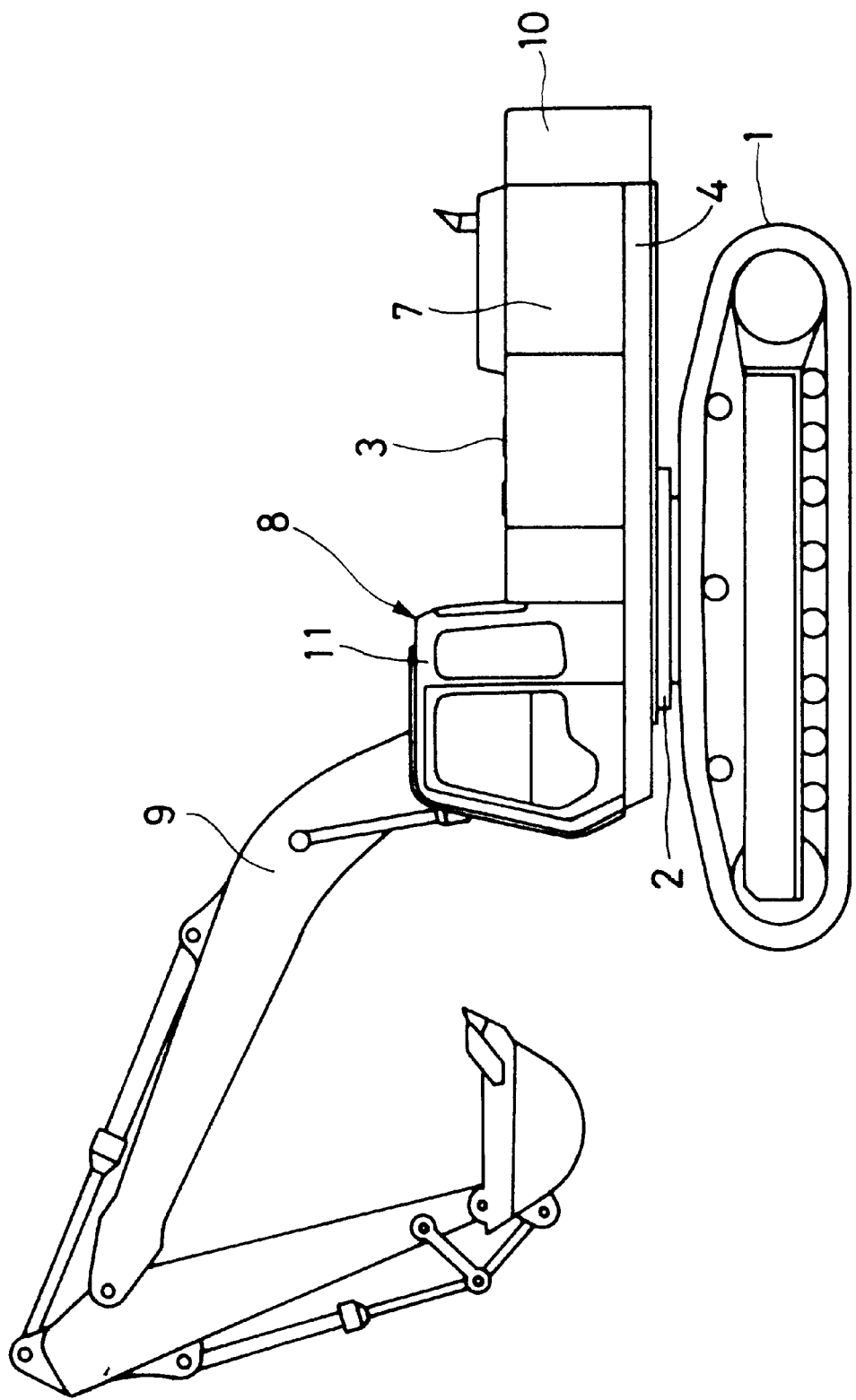
FIG. 1 is a schematic outer view of a hydraulic power shovel incorporating a first embodiment of the present invention.
Figure 2:
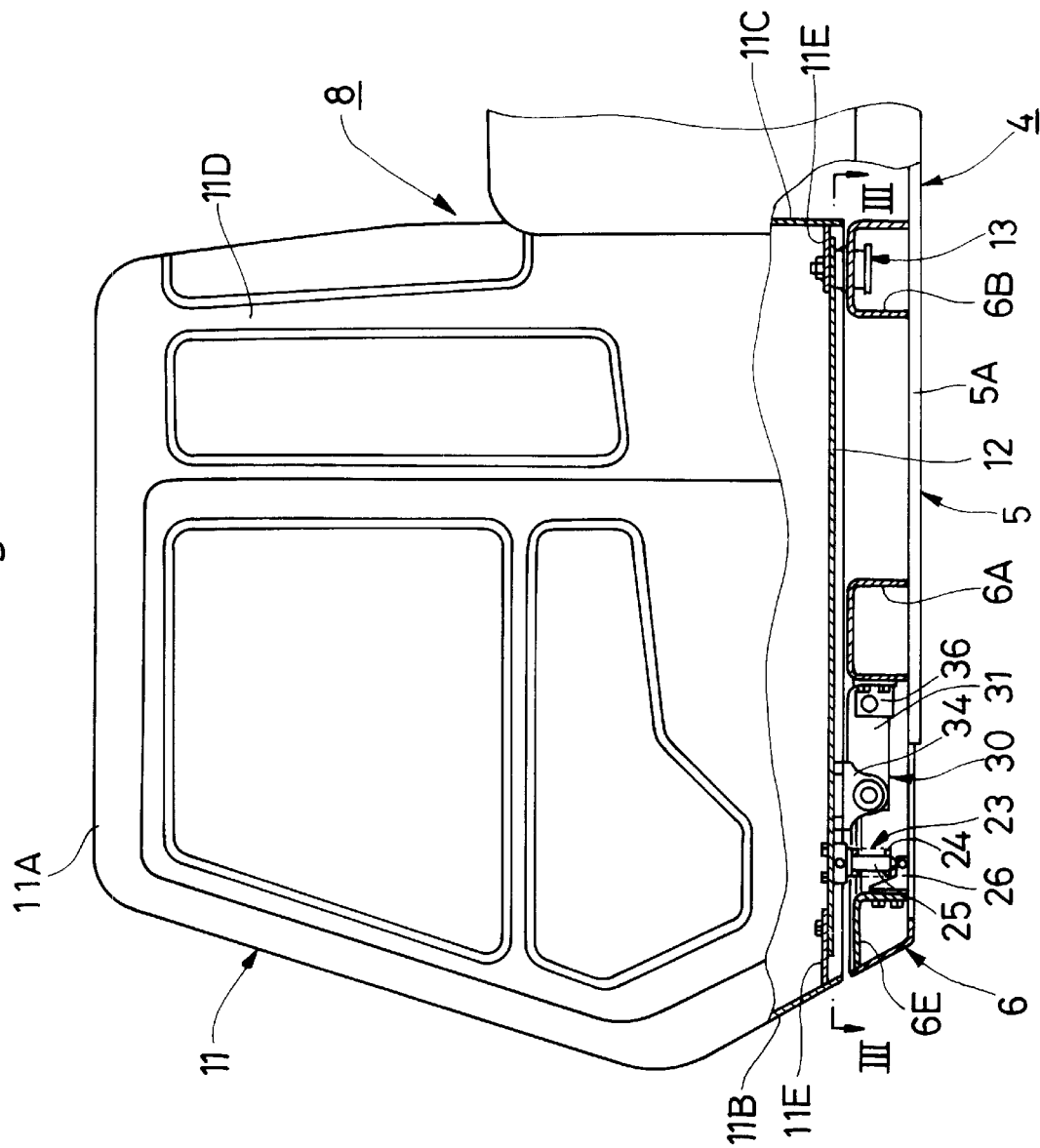
FIG. 2 is a partly cutaway outer view of operator's cab, rotary frame etc. of the power shovel shown in FIG. 1.
Figure 3:
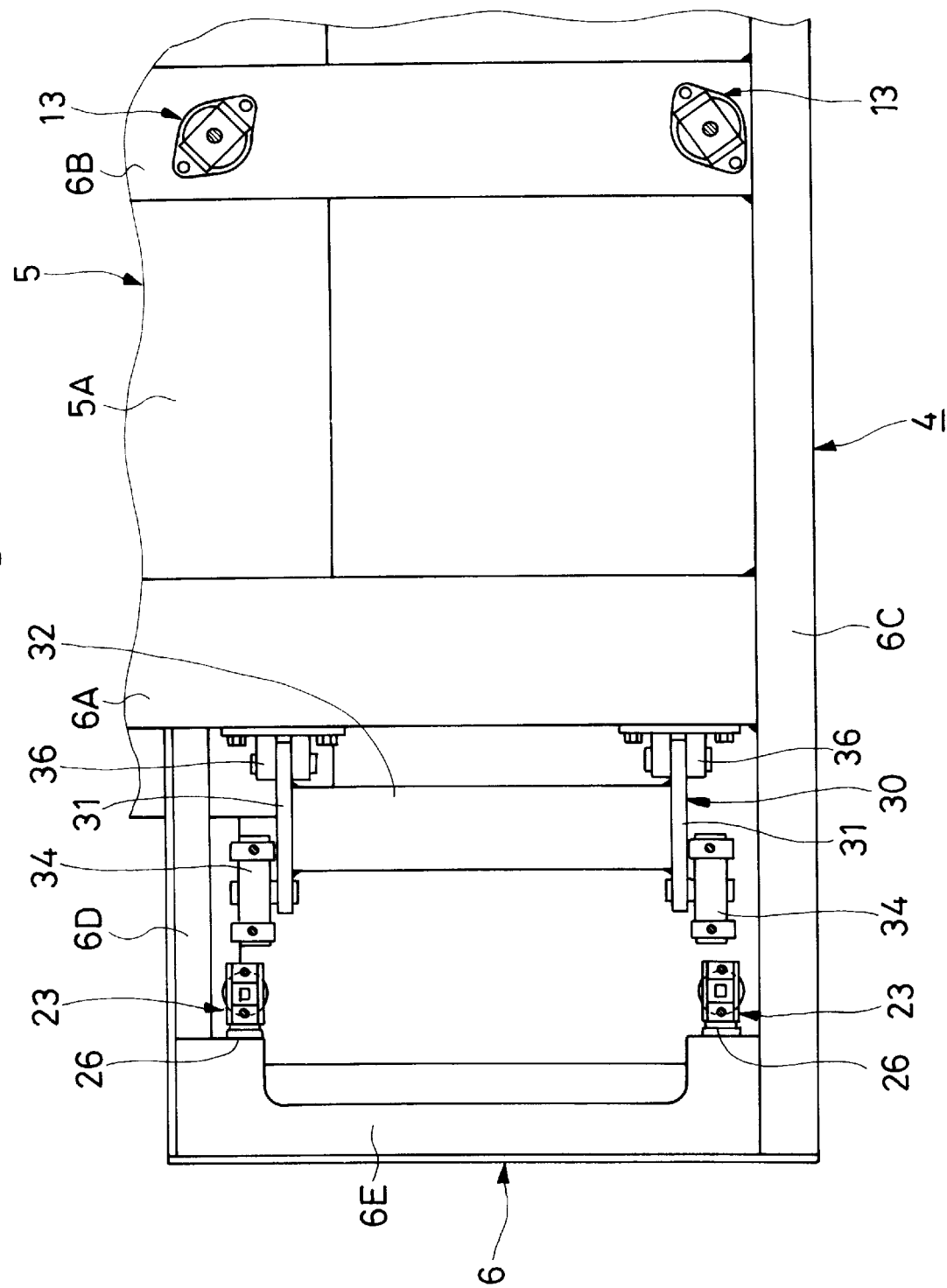
FIG. 3 is a sectional view taken from the direction of arrow III—III of FIG. 2.

In this instance, as shown in FIGS. 2 and 3, the revolving frame 4 has a center frame 5 which is mounted on the swing gear 2, and a cab support portion 6 which is provided on the left-front side of the center frame 5 to support from beneath a cab body which will be described hereinafter.

The center frame 5 is constituted by a bottom plate 5A which is in the form of a steel plate having an increased thickness in center portions thereof, and a longitudinal plate (not shown) which is extended over the bottom plate 5A in forward and rearward directions. Further, the cab support portion 6 is largely constituted by a couple of transverse beam members 6A and 6B of inversed U-shape in section, which are extended in the transverse direction, a side frame member 6C which is extended in the longitudinal direction to connect left end portions of the transverse beam members 6A and 6B, a longitudinal beam 6D which is projected in the longitudinal direction on and from the front side of the transverse beam member 6A in parallel relation with the side frame member 6C, and a front frame member 6E which is extended in the transverse direction on the front side of the transverse beam member 6A to connect the side frame member 6C and longitudinal beam member 6D with each other.

Further, the upper revolving body 3 is largely constituted by the revolving frame 4, a machine chamber 7 which is provided on the revolving frame 4, an operator's cab 8 which is located in a position on the left-front side of machine chamber 7 and enclosed by a cab body 11, a working mechanism 9 which is located on the front side of the machine chamber 7 and can be turned up and down in vertical directions, and a counter weight 10 which is provided on a rear portion of the revolving frame 4 behind the machine chamber 7 as a balancing weight for the front working mechanism 9.

Indicated at 11 is the cab body which is mounted on top of the cab support member 6 of the revolving frame 4, and, as shown in FIG. 2, formed in a box-like shape, for example, by press-forming and welding steel plates. More particularly, the cab body includes a rectangular top wall portion 11A which is extended in the longitudinal direction of the working machine, a front wall portion 11B which is angularly bulged out to the front side in its middle portion, a rear wall portion 11C located on the opposite side from the front wall portion 11B, and right and left side wall portions 11D (only one side wall portion 11D is shown in the drawings). A floor panel 12 which forms part of the operator's cab, is fixed on the lower side of the cab body 11 through floor support brackets 11E. A seat to be occupied by an operator and a number of control levers for operating the working mechanism 9 are provided internally of the cab body 11 (although not shown in the drawings).

Denoted at 13 are liquid sealed-in type rubber mounts which are employed in this embodiment as first anti-vibrational mounts for resiliently supporting the cab body 11 on the revolving frame 4 and at the same time for attenuating its vibrations. A couple of rubber mounts 13 are provided in laterally spaced positions under rear portions of the cab body 11.

Figure 4:
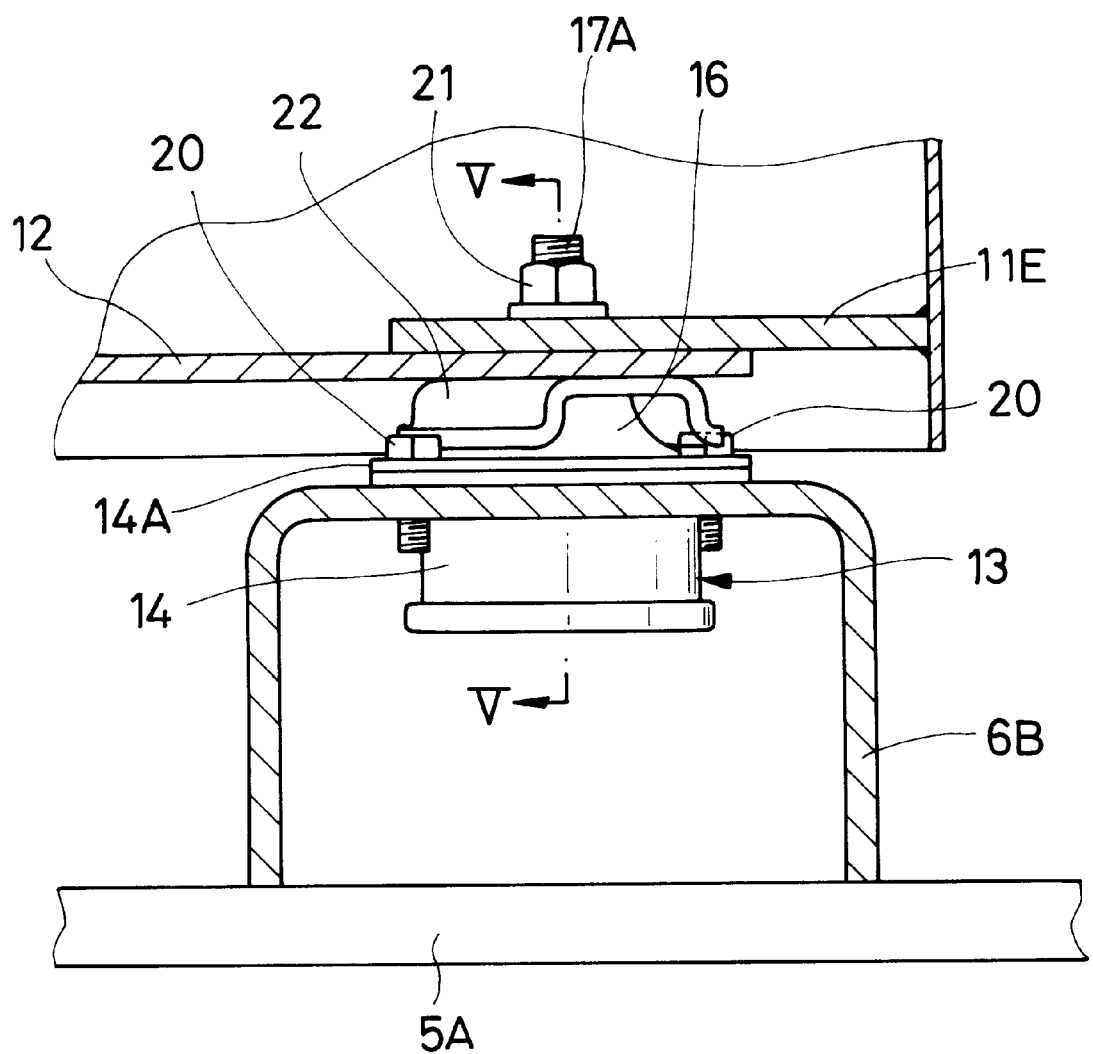
FIG. 4 is an enlarged fragmentary view of a rubber mount etc. shown in FIG. 2.
Figure 5:
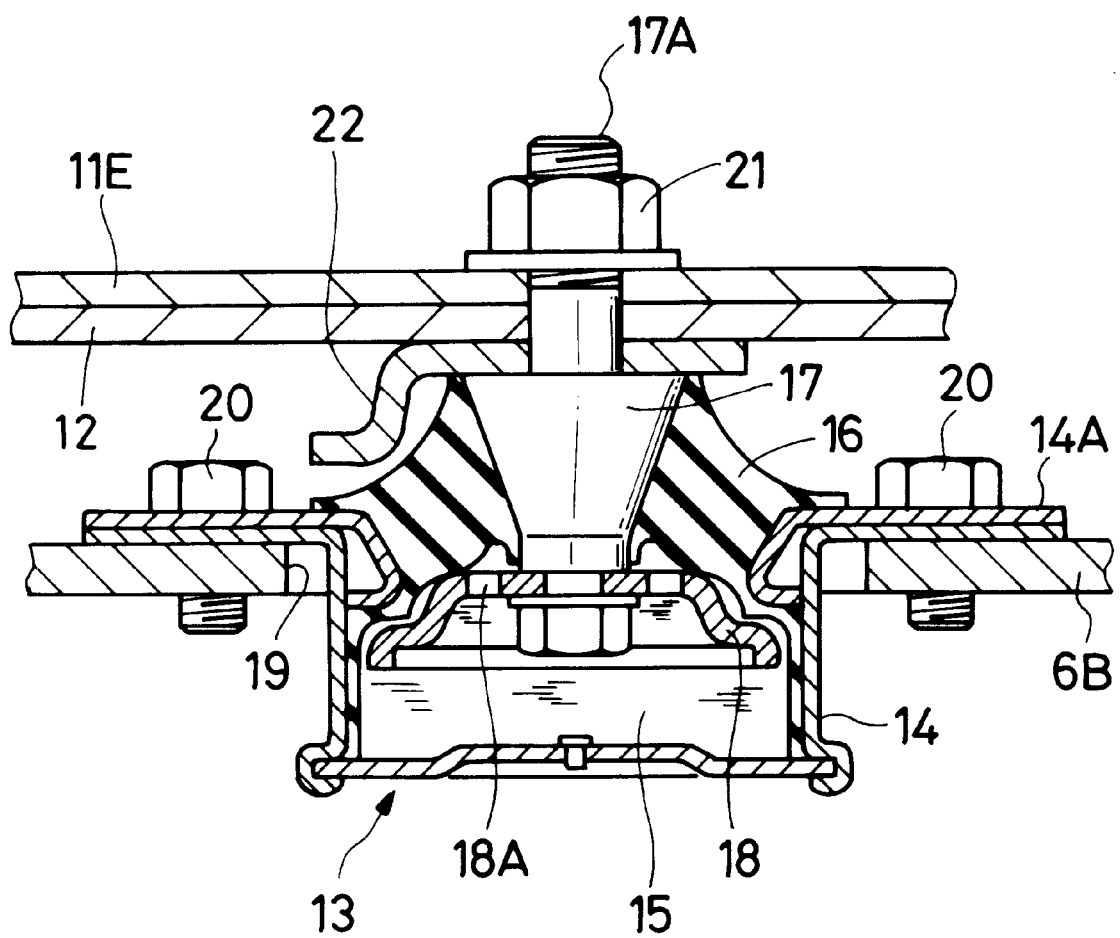
FIG. 5 is a sectional view taken from the direction of arrows V—V of FIG. 4.

As shown in FIGS. 4 and 5, each one of the rubber mounts 13 includes a blind-bottomed cylindrical casing 14 with a flange 14A around the upper end thereof, a resilient member 16 of rubber or the like which is fixedly fitted in and over the cylindrical casing 14 in such a way as to close the upper side of the cylindrical casing 14 in the fashion of a lid or plug, defining a closed attenuation force generating chamber 15 within the cylindrical casing 14, a connecting shaft 17 which is securely anchored in the resilient member 16 in its lower end portion centrally of the cylindrical casing 14 and provided with a male screw portion 17A on its upper end portion, and a movable plate 18 which is securely fixed on a lower end portion of the connecting shaft 17 within the attenuating force generating chamber 15 and provided with bored oil holes 18A in its top wall portions. A highly viscous operating oil such as silicon oil, for example, is sealed in the attenuating force generating chamber 15.

The cylindrical casing 14 of the rubber mount 13 is fitted in an opening 19 which is formed in the transverse beam member 6B of the cab support portion 6, and has its flange portion 14A securely fixed on the upper side of the transverse beam member 6B by means of bolts 20. The connecting shaft 17 is securely fixed to the cab body 11 by threading a nut 21 on its male screw portion 17A which is passed through the floor panel support brackets 11E and floor panel 12. The reference numeral 22 indicates a stopper which is provided between the connecting shaft 17 and the floor panel 12. In order to prevent the resilient member 16 from being deformed beyond a limit of its resiliency, the stopper member 22 is abutted against the upper side of the cylindrical casing 14 when the resilient member 16 is deformed to a large degree by vibrations of the cab body 11.

The rubber mount 13 functions to support the cab body 11 resiliently on the revolving frame 4 through the resilient member 16 which undergoes elastic deformations according to the magnitude of vibrations of the cab body 11. In turn, according to the extent of elastic deformations of the resilient member 16, the movable plate 18 is moved up and down within the attenuating force generating chamber 15, thereby causing the operating oil to flow up and down within the attenuating force generating chamber 15 through the oil holes 18A and peripheral edges of the movable plate 18. At this time, the flow of highly viscous operating oil is restricted by the movable plate 18, and as a consequence attenuating forces are generated against upward and downward vibrational movements of the cab body 11 by viscous resistance and drift resistance of the operating oil.

In this instance, for example, the spring constant in the vertical direction of the rubber mount 13 is set approximately at $5 \times 10^5$ to $15 \times 10^5$ (N/m), and attenuation coefficient is set approximately at $1 \times 10^4$ to $2 \times 10^4$ (N·sec/m).

Indicated at 23 are spring mounts which are employed in this embodiment as second anti-vibrational mounts to constitute the cushioning support means along with the above-described rubber mounts 13. In the particular embodiment shown, a couple of spring mounts 23 are located in two laterally spaced positions under front portions of the cab body 11.

Figure 6:
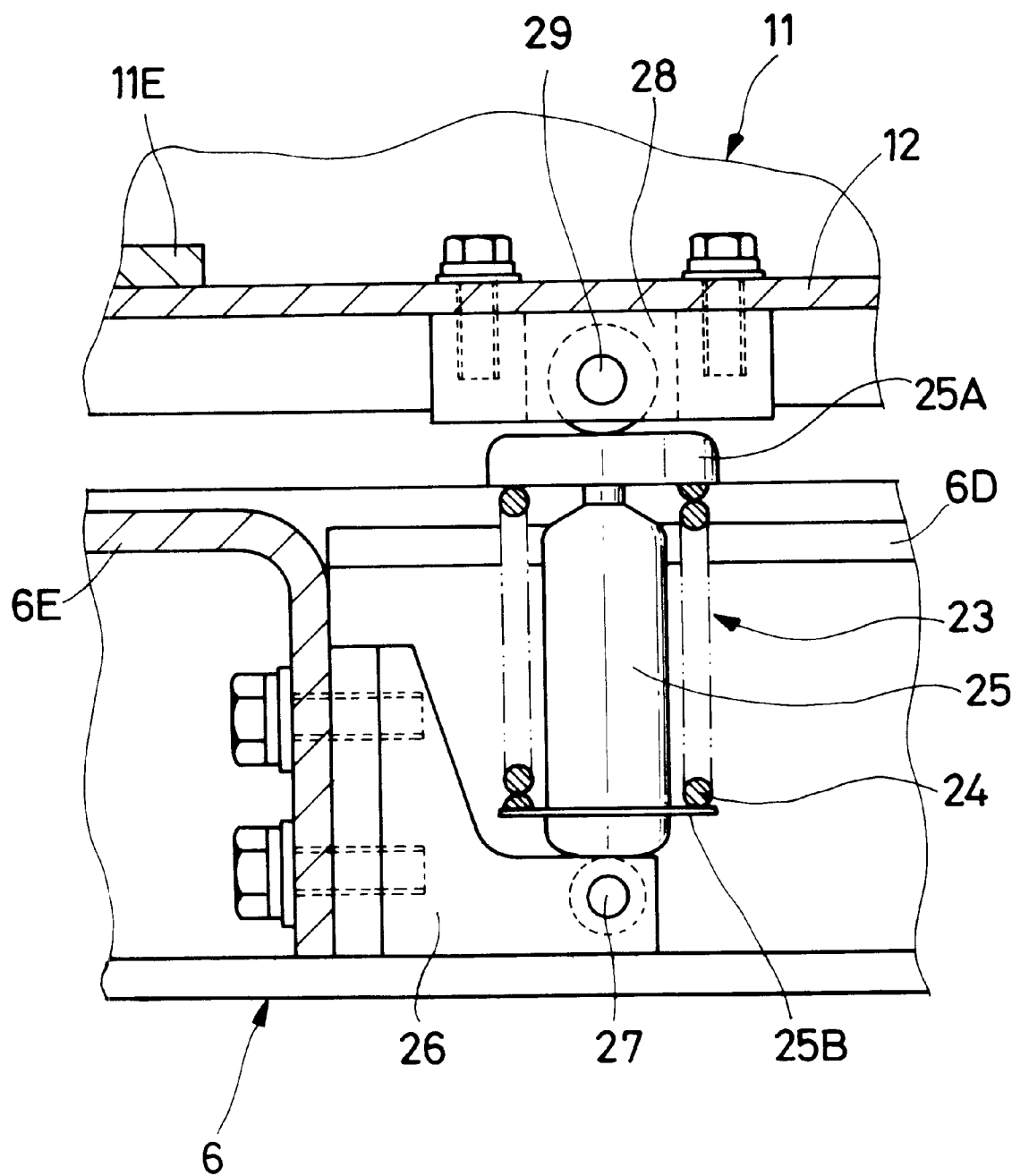
FIG. 6 is an enlarged fragmentary view of a spring mount etc. shown in FIG. 2.

As shown in FIG. 6, each spring mount 23 includes a coil spring 24 which resiliently supports the cab body 11, and an oil damper 25 which is positioned centrally of the coil spring 24 to attenuate vibrations of the cab body 11. The coil spring 24 is compressedly interposed between a rod-side spring retainer 25A and a cylinder-side spring retainer 25B which are provided on the oil damper 25. The spring constant of the coil spring 24 is set at a value which is considerably smaller than that of the above-described rubber mount 13, for example, approximately at a value in the range of from $4 \times 10^4$ to $10 \times 10^4$ (N/m). The attenuation coefficient of the oil damper 25 is set, for example approximately at a value in the range of from $2 \times 10^3$ to $6 \times 10^3$ (N·sec/m).

The bottom end of the oil damper 25 is mounted on a bifurcated bracket 26 on the frame side, which is bolted to the front frame portion 6E of the cab support portion 6, through a pin 27 to permit rocking motions in forward and rearward directions. The top end of the oil damper 25 is supported on a rectangular frame-like bracket 28 on the side of the operator's cab, which is bolted to the lower side of the floor panel 12 of the cab body 11, through a pin 29 to permit rocking movements in the forward and rearward directions.

Thus, through the coil spring 24 which is compressed and stretched according to the magnitude of vibrations of the cab body 11, the spring mounts 23 can resiliently support the cab body 11 on the revolving frame 4, with a smaller spring constant than the above-described rubber mounts 13, while attenuating the vibrations of the cab body 11 by the oil dampers 25.

Figure 7:
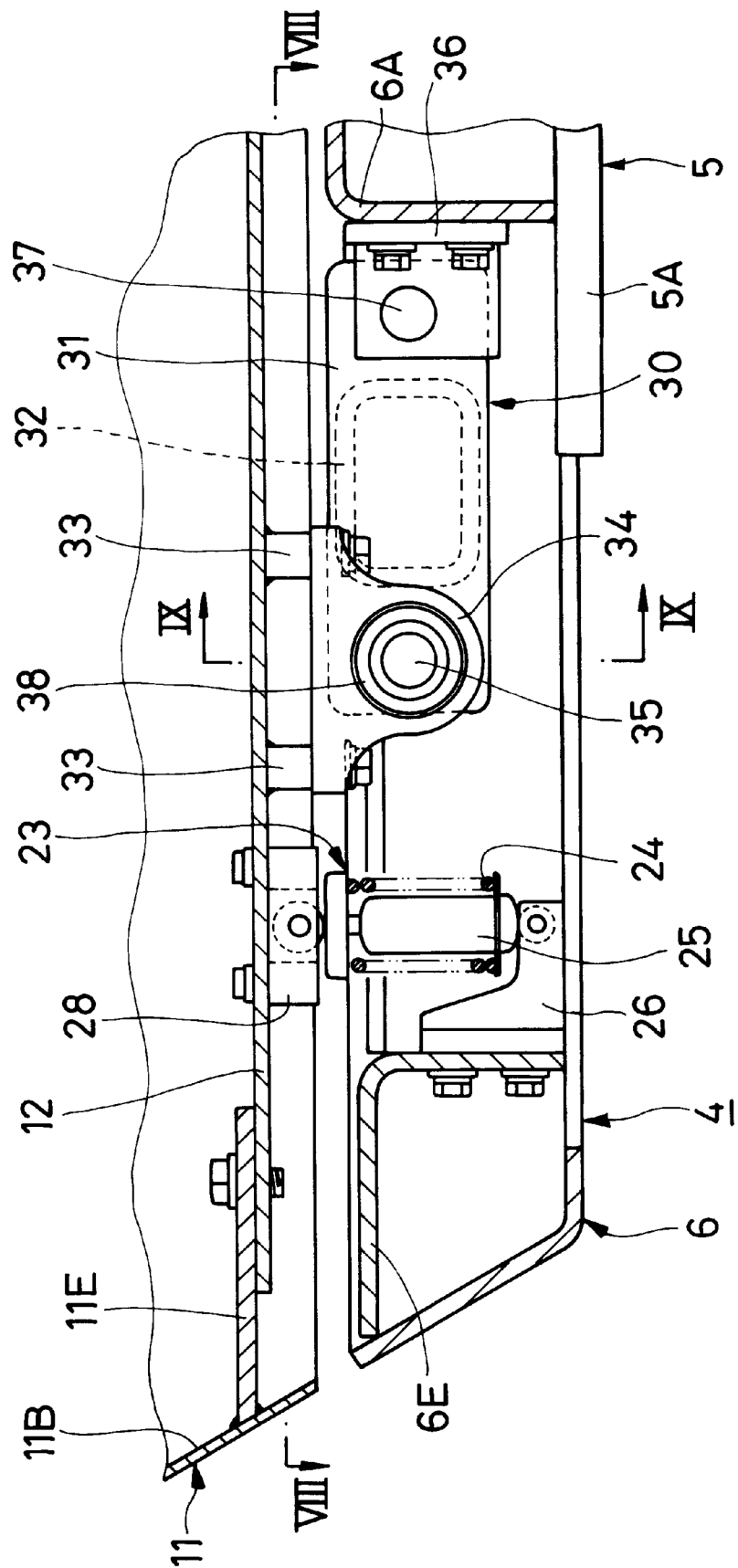
FIG. 7 is an enlarged fragmentary view of the spring mount, link mechanism etc. shown in FIG. 2.
Figure 8:
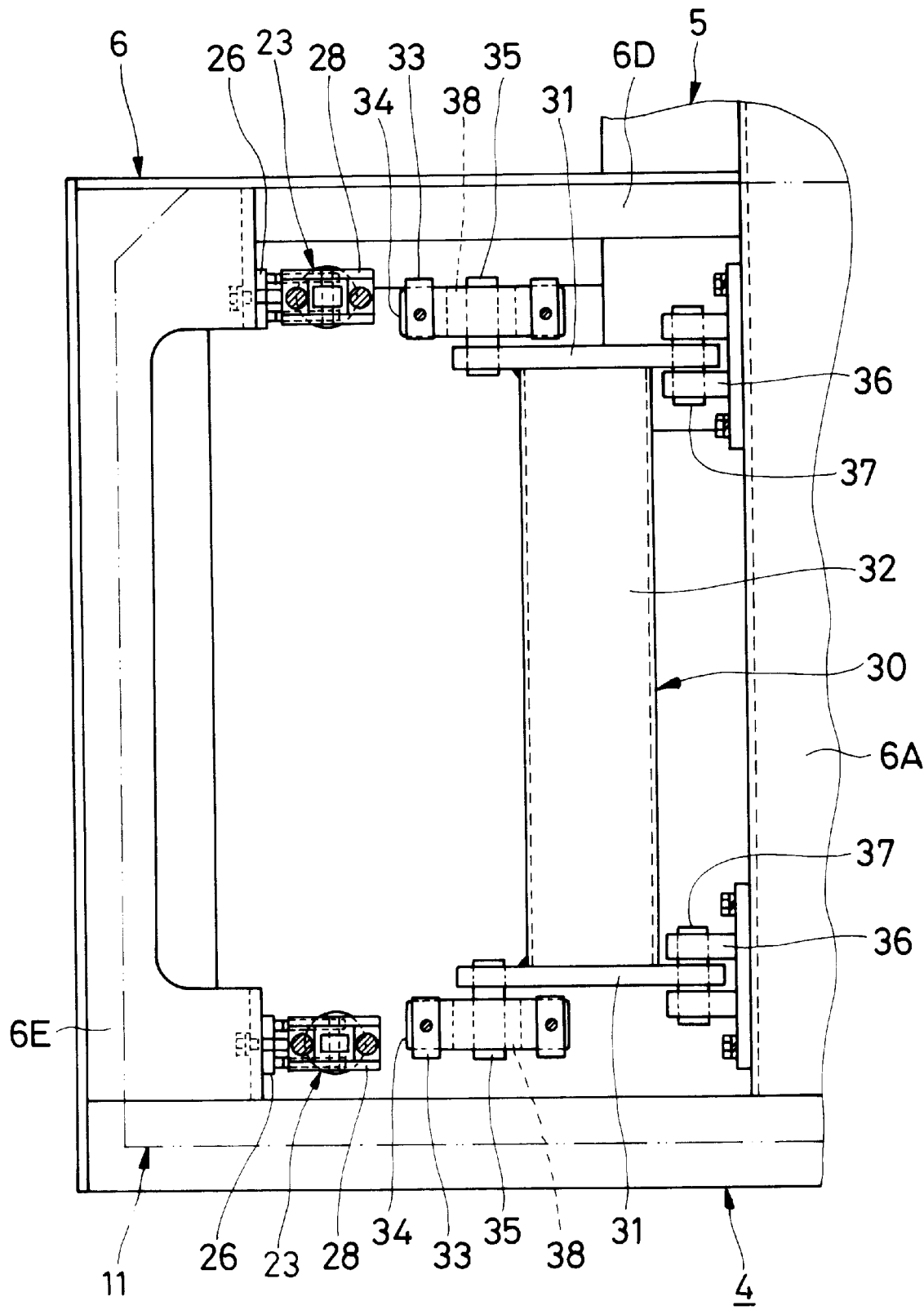
FIG. 8 is a sectional view taken from the direction of arrow VIII—VIII of FIG. 7.

Designated at 30 is a link mechanism which is located in the vicinity of the spring mounts 23 and between the cab support portion 6 of the revolving frame 4 and the cab body 11. As seen in FIGS. 7 and 8, the link mechanism 30 is constituted by a pair of link plates 31 which are extended in parallel relation with each other in the longitudinal direction of the working machine and spaced apart from each other in the lateral direction, a connecting pipe 32 which connects to the link plates 31 in the lateral direction, and resilient bushes 38 which will be described hereinafter.

The link plates 31 have the respective fore ends rotatably connected through resilient bush 38 and connecting pin 35 to brackets 34 on the side of the operator's cab, which are securely fixed to the lower side of the floor panel 12 through screw sheets 33. Rear ends of the link plates 31 are also rotatably connected through a connecting pin 37 to bifurcated brackets 36 on the side of the frame, which are securely bolted to the transverse beam member 6A of the cab support portion 6.

Thus, in cooperation with the rubber mounts 13 under rear portions of the cab body 11, the link mechanism 30 functions to determine the position of the cab body 11 on the revolving frame 4 in forward and rearward directions as well as in lateral directions or in rightward and leftward directions of the working machine.

The link mechanism 30 permits vertical vibrations (bouncing) of the cab body on the revolving frame 4, but it restricts free vertical movements of the two link plates 31 when the cab body 11 is vibrated in lateral directions (rolling) on the revolving frame 4. Consequently, the link mechanism 30 contributes to increase the rigidity against rolling motions of the cab body 11.

Figure 9:
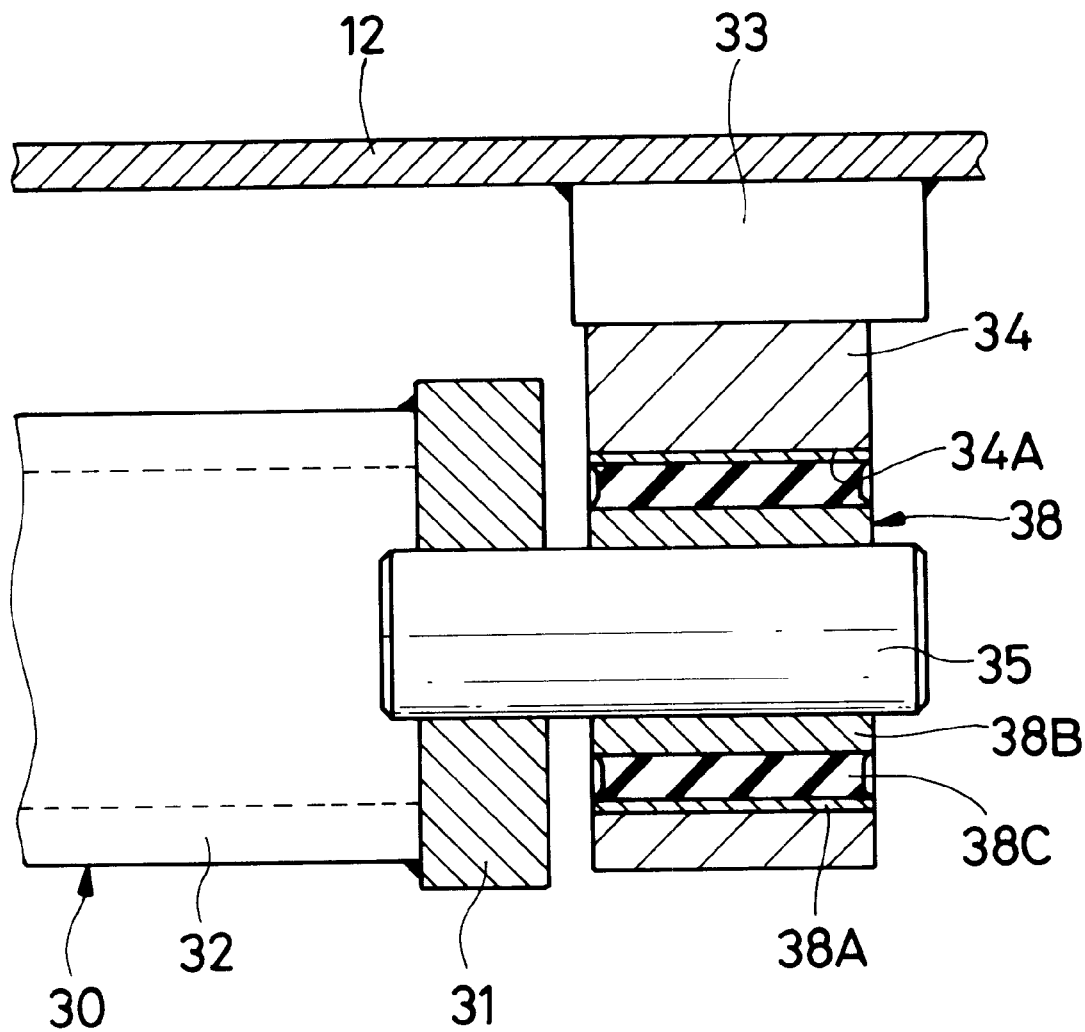
FIG. 9 is an enlarged sectional view taken from the direction of arrows IX—IX of FIG. 7.
Figure 10:
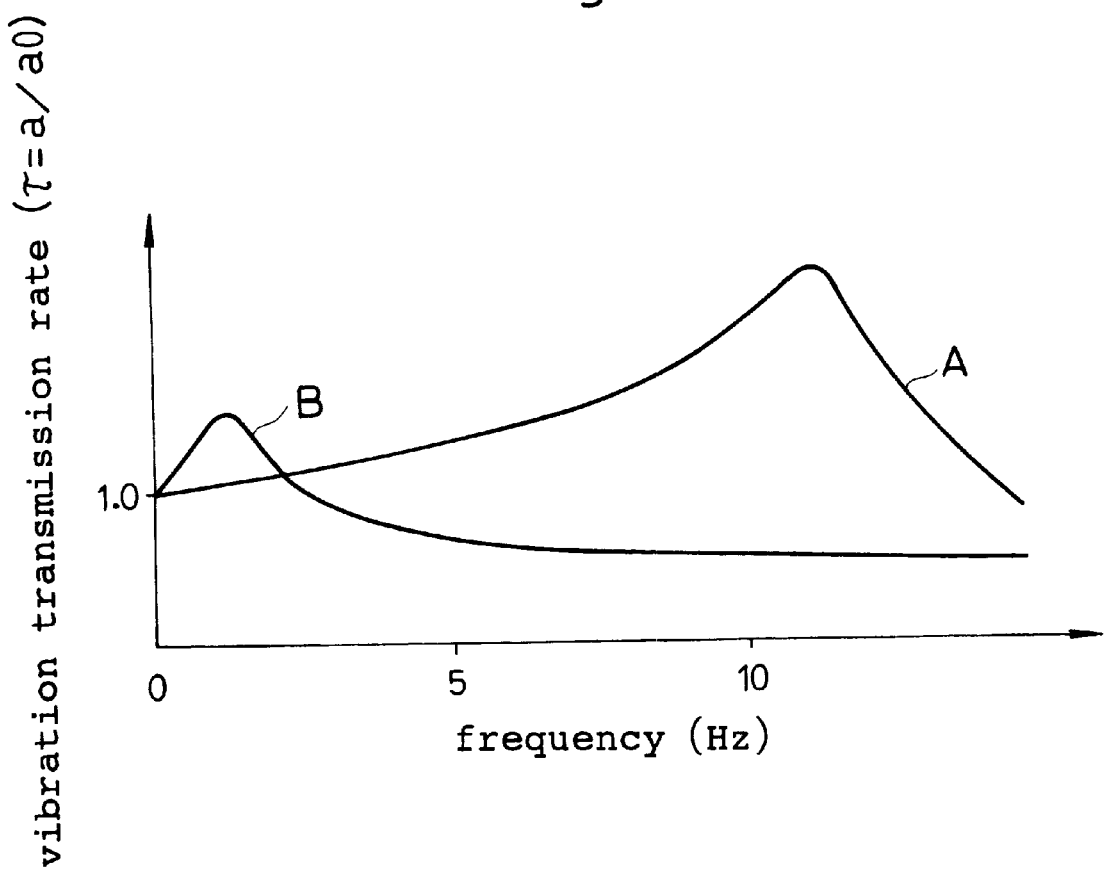
FIG. 10 is a characteristics diagram illustrating the relationship between the vibration transmission rate and frequency with regard to pitching vibration which is transmitted from support frame to operator's cab.

Indicated at 38 are resilient bushes which are provided at the pivotal joints of fore end portions of the link plates 31 with the brackets 34 on the side of the operator's cab. As shown in FIG. 9, the resilient bushes 38 are each constituted by outer and inner sleeves 38A and 38B of steel material, and a rubber bush 38C sandwiched between the outer and inner sleeves 38A and 38B around the entire inner and outer peripheries thereof. In this instance, the rubber bush 38 is forcibly fitted and securely inserted in a fitting hole 34A which is formed in the bracket 34 on the side of the operator's cab. Fore end portions of the link plates 31 of the link mechanism 30 are connected to the brackets 34 on the side of the cab body through the connecting pins 35 which are forcibly fitted in the inner sleeves 38B of the respective resilient bushes 38.

Thus, by the insertion of the resilient bushes 38 at the pivotal joints of fore end portions of the link plates 31 with the respective brackets 34 on the side of the cab body, vibrations of relative high frequencies as would result in generation of resounding noises in the operator's cab are prevented from being transmitted to the cab body 11 from the revolving frame 4 through the link mechanism 30.

In operation of the hydraulic power shovel incorporating the above-described construction according to the embodiment of the present invention, transmission of vibrations to the cab body 11 is damped out in a manner unique to the present invention as explained below in greater detail.

Firstly, when the working machine is put in travel or in operation, vibrations of the base carrier 1 or vibrations of the working mechanism 9 are transmitted to the cab body 11 through the revolving frame 4, causing the cab body 11 to vibrate in the forward and rearward directions (pitching). Under these circumstances, the front side of the cab body 11 is resiliently supported by the spring mounts 23 which have a smaller spring constant than the rubber mounts 13, which support the rear side of the cab body 11. As a result, the pitching can be sustained with smaller rigidity.

In this connection, it has been known that normally pitching at frequencies of around 10Hz takes place most frequency during operation of hydraulic power shovels. Besides, as indicated by the characteristics curve A in the diagram of FIG. 10, the transmission rate of pitching vibrations from the revolving frame 4 to the cab body 11 becomes maximum at frequencies of around 10Hz in the case of a prior art hydraulic power shovels. In contrast, in the case of a hydraulic power shovel according to the embodiment of the present invention, the transmission rate of pitching vibrations from the revolving frame 4 to the cab body 11 at frequencies around 10Hz is conspicuously reduced as indicated by characteristics curve B. Regarding the term "vibration transmission rate $\tau$" used here, in case the revolving frame 4 is in vibration of amplitude $a_o$ in vertical direction and its vibration is transmitted to the cab body 11 in an amplitude of a, the vibration transmission rate is expressed as $\tau = a/a_0$.

Thus, the pitching vibration transmission rate from the revolving frame 4 to the cab body 11 can be suppressed and pitching of the cab body 11 can be damped in a secure manner, by setting a smaller spring constant for the spring mounts 23 which support the front side of the cab body 11, as compared with the rubber mounts 13 which support the rear side of the cab body 11. Besides, pitching of the cab body 11 can be attenuated effectively by the vibration attenuating action of the oil dampers 25 of the spring mounts 23.

Further, in case vertical vibration (bouncing) occurs to the cab body 11, the bouncing movements of the cab body 11 can be converted into pitching movements about the rubber mounts 13 because the spring mounts 23 have smaller support rigidity as compared with the rubber mounts 13. Since pitching vibrations are cushioned by the spring mounts 23 as described hereinbefore, ultimately the bouncing of the cab body 11 can also be reduced in a secure and reliable manner.

Further, when the cab body 11 is put in lateral vibrations (rolling) on the revolving frame 4, such rolling vibrations are supported with greater rigidity by the rubber mounts 13 which are located under rear portions of the cab body 11.

At this time, front portions of the operator's cab are resiliently supported by the spring mounts 23 with smaller rigidity against rolling vibrations because of its relatively small spring constant as compared with that of the rubber mount 13. In contrast, the link mechanism 30, which is located in the vicinity of the spring mounts 23, has a pair of link plates 31 connected with each other rigidly by the connecting pipe 32. Accordingly, the link mechanism 30 functions to suppress the upward and downward movements to which the two link plates 31 are subjected alternately and inversely to each other when the cab body 11 is in rolling vibrations, and as a result to improve substantially the rigidity against rolling vibrations in front portions of the cab body 11.

Namely, rolling vibrations of the cab body 11 can be supported with large rigidity by the combination of the rubber mounts 13 and link mechanism 30, thereby securely preventing the cab body 11 from being tilted largely in lateral directions to such a degree as to interfere with the working mechanism 9 or other nearby structures.

Besides, as the resilient member 16 of the rubber mounts 13 undergoes elastic deformations according to the magnitude of vibration of the cab body 11, the movable plate 18 is moved up and down within the attenuating force generating chamber 15 to generate large attenuating forces by the viscosity of the operating oil. Accordingly, the rubber mounts 13 can attenuate rolling vibrations of the cab body 11 effectively, preventing same from going into greater vibrations as a result of resonance.

Further, the resilient bushes 38, which are interposed at the joints of the respective link plates 31 of the link mechanism 30 with the brackets 34 on the part of the cab body 11, contribute to preclude resounding noises within the operator's cab as caused by vibrations of relatively high frequencies which would otherwise be transmitted from the revolving frame 4 to the cab body 11 through the link mechanism 30.

Further, by varying the hardness of the rubber bushes 38C of the resilient bushes 38, it becomes possible to adjust the rigidity of the link mechanism 30 against rolling vibrations of the cab body 11, for example, to secure suitable rigidity for supporting rolling vibrations of the cab body 11.

As explained above, according to the embodiment of the present invention, the transmission of pitching vibration from the revolving frame 4 to the cab body 11 can be suppressed to a low level by setting a smaller spring constant for the spring mounts 23, which resiliently support front portions of the cab body 11, as compared with the spring constant of the rubber mounts 13 which resiliently support rear portions of the cab body 11. In addition, pitching of the cab body 11 can be attenuated effectively by vibration attenuating actions of the oil dampers 25 which are provided on the spring mounts 23.

Further, the bouncing vibrations of the cab body 11 can be substantially converted into pitching vibrations about the rubber mounts 13, and ultimately the rolling vibrations are damped by the spring mounts 23. As a result, bouncing vibrations of the cab body 11 can also be reduced.

Thus, the amenity within the operator's cab 8 as well as the operationability of control levers which are installed in the operator's cab 8 can be improved to a considerable degree.

Moreover, the link mechanism 30 which is located in the vicinity of the left and right spring mounts 23 contributes to compensate for small rigidity of the spring mounts 23 in supporting rolling vibrations of the cab body 11. Namely, rolling vibrations of the cab body 11 can be supported by the rubber mounts 13 and link mechanism 30 with larger rigidity to prevent the cab body 11 from being tilted largely in lateral directions, for example, to such a degree as to interfere with the working mechanism 9 or other structures.

Furthermore, since arrangements are made to support rear portions of the cab body 11 resiliently by the rubber mounts 13 and front portions of the cab body 11 resiliently by the spring mounts 23 and link mechanism 30 as described above, it becomes possible to simplify the construction of the operator's cab 8 as a whole and to cut the production cost, for example, as compared with a case where the cab body is supported by spring mounts 23 and a link mechanism 30 in both front and rear portions thereof.

Figure 11:
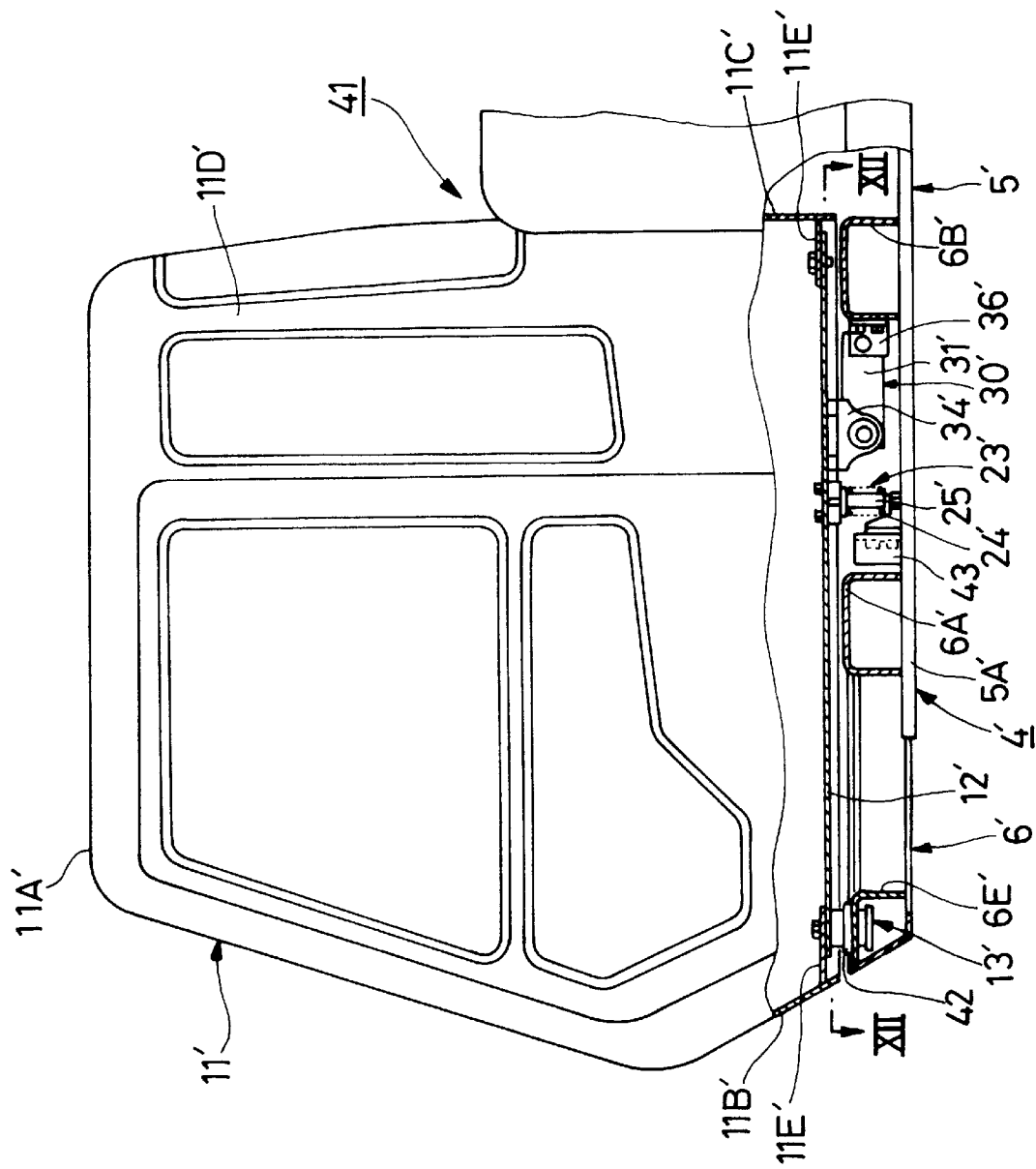
FIG. 11 is a partly cutaway outer view of a cab body, rotary frame etc. in a second embodiment of the present invention.

Referring now to FIGS. 11 and 12, there is shown a second embodiment of the present invention. In the following description of the second embodiment, those component parts which are identical with the counterparts in the foregoing first embodiment are designated simply by apostrophized corresponding reference numerals to avoid repetitions of the same explanations.

In these figures, indicated at 41 is an operator's cab employed in this second embodiment, having an cab body 11' resiliently supported on a revolving frame 4' by a cushioning support means including rubber mounts 13', spring mounts 23' and a link mechanism 30' in the same manner as the operator's cab 8 in the above-described first embodiment. However, this embodiment differs from the first embodiment in that it is arranged to support front portions of the cab body 11' by rubber mounts 13' and rear portions of the cab body 11' by spring mounts 23' and link mechanism 30'.

In this instance, the rubber mounts 13' are mounted in laterally spaced positions on a front frame member 6E' of a cab support portion 6' through spacers 42 to support front portions of the cab body 11' resiliently with large rigidity.

The spring mounts 23' are mounted in laterally spaced positions on the revolving frame 4' through L-shaped brackets 43, which are securely welded to a center frame 5' of a revolving frame 4' and a side frame member 6C' of the cab support portion 6', respectively, to support rear portions of the cab body 11' resiliently with small rigidity.

Further, with regard to the link mechanism 30', front ends of link plates 31' are connected to brackets 34' which are securely fixed to the lower side of a floor panel 12' in the vicinity of the spring mounts 23', while rear ends of the link plates 31' are connected to brackets 36' which are securely fixed on a transverse beam member 6B' of the cab support portion 6'. Similarly, the link plates 31' are connected with each other by a connecting pipe 32'. Thus, in cooperation with the rubber mounts 13' which are located under front portions of the cab body 11', the link mechanism 30' determines the position of the cab body 11' on the revolving frame 4' in longitudinal and transverse directions of the working machine.

In this second embodiment with the arrangements as described above, the spring mounts 23' which support rear portions of the cab body 11' is arranged to have a smaller spring constant than the rubber mounts 13' which support front portions of the cab body 11', thereby suppressing the pitching vibration transmission rate from the revolving frame 4' to the cab body 11' and damping the pitching vibrations of the cab body 11' in a secure and reliable manner. Besides, thanks to the vibration attenuating action of the oil dampers 25' of the spring mounts 23', the pitching vibrations of the cab body 11' can be attenuated very effectively.

Further, the vertical vibrations (bouncing) of the cab body 11' can be converted substantially into pitching vibrations about the rubber mounts 13' because the rigidity of support by the spring mounts 23' is smaller than that of the rubber mount 13'. As a consequence, bouncing of the cab body 11' can be prevented in an assured manner since the pitching vibrations are ultimately damped by the spring mounts 23' as described hereinbefore.

Furthermore, in case the cab body 11' is put in vibrations in lateral directions (rolling) on the revolving frame 4', such rolling vibrations can be supported with large rigidity by the rubber mounts 13' which are provided under front portions of the cab body 11'.

At this time, although the spring mounts 23' which resiliently support rear portions of the cab body 11' have smaller rigidity against rolling vibrations, the link mechanism 30' which is provided in the vicinity of the spring mounts 23' has a pair of link plates 31' rigidly connected with each other by the connecting pipe 32' to substantially enhance the rigidity against rolling in front portions of the cab body 11', thereby suppressing the alternate upward and downward movements which would occur inversely to the link plates 31' when the cab body 11' is in rolling vibrations.

As a result, rolling of the cab body 11' can be supported with large rigidity by the left and right rubber mounts 13' and the link mechanism 30' in a secure manner, preventing the cab body 11' from being largely tilted in lateral directions to interfere with the working mechanism or other part of the working machine.

Although the spring mount 23 is provided in two laterally spaced positions between the cab body 11 and the revolving frame 4 in the above-described first embodiment, it is to be understood that the present invention is not restricted to the particular arrangements shown. For instance, there may be employed a single spring mount 23 or three or more spring mounts 23, if desired. Further, instead of the combination of coil spring 24 and oil damper 25 as shown in the first embodiment, the spring mount 23 may employ other spring means like a leaf spring in combination with the oil damper. The same applies to the second embodiment described above.

Further, regarding the resilient bush 38, the present invention is not restricted to the particular arrangements shown in connection with the first embodiment where the resilient bush 38 is inserted at the joint of each link plate 31 of the link mechanism 30 with the bracket 34 on the side of the cab body 11, which is securely fixed to the floor panel 12 of the cab body 11. For example, the resilient bush 38 may be inserted at the joint of each link plate 31 with the bracket 36 on the side of the frame, which is securely fixed to the transverse beam member 6A of the cab supporting portion 6. Alternatively, the resilient bush 38 may be inserted at both of the joints of each link plate 31 with the bracket 34 on the side of the operator's cab and the bracket 36 on the side of the frame. The same applies to the second embodiment described above.

On the other hand, the cab body 11 is formed in a box-like shape in the first embodiment, having an operator's seat enclosed by wall or panel members on all sides, including top wall portion 11A, front wall portion 11B, rear wall portion 11C and lateral or left and right wall portions 11D. Needless to say, the present invention is not particularly restricted to the operator's cab of this sort. For example, the cab body may be constituted simply by a canopy-like roof hanging over an operator's seat. Similarly, the same applies to the second embodiment.

Furthermore, it is to be understood that the present invention is not restricted to hydraulic power shovels as shown in the foregoing embodiments, and can be similarly applied to other working machines with an operator's cab, for example, working machines such as wheel loaders, hydraulic cranes etc.

Industrial Applicability

As clear from the foregoing particular description, according to the present invention, arrangements are made to support either front or rear end portions of a cab body resiliently by a first anti-vibrational mount and to support the opposite end portions of the cab body by a second anti-vibrational mount with a smaller spring constant than the first anti-vibrational mount, thereby providing smaller rigidity against pitching vibrations of the cab body. This makes it possible to suppress the transmission rate of pitching vibrations from the support frame to the cab body. Besides, pitching vibrations of the cab body can be effectively attenuated by oil dampers of the second anti-vibrational mount.

In addition, by the use of the second anti-vibrational mount which is arranged to support the cab body resiliently with a smaller spring constant than the first anti-vibrational mount, bouncing vibrations of the cab body can be substantially converted into pitching vibrations about the first anti-vibrational mount, while buffering the pitching motions by the second anti-vibrational mount.

Further, resonance of the cab body can be prevented by the first anti-vibrational mount which is arranged to support rolling of the cab body while attenuating its vibrations.

As a result, the amenity of the operator's cab can be improved to a marked degree, not to mention improvements in operationability of various control levers which are provided in the operator's cab.

Further, according to the present invention, a link mechanism is provided in the vicinity of the second anti-vibrational mount to restrict lateral or sideward vibrations of the cab body on the support frame. Therefore, despite a drop in rigidity against rolling vibrations of the cab body, which might result from the use of the second anti-vibrational mount adapted to support the cab body resiliently with a smaller spring constant than the first anti-vibrational mount, the link mechanism functions to restrict lateral vibrations of the cab body. Accordingly, it can securely prevents the cab body from being tilted largely in lateral directions to such a degree as to interfere with the working mechanism or other structures.

Furthermore, according to the present invention, the link mechanism is constituted by a pair of link members each having one end thereof connected to the cab body and the other end to the support frame, and a connecting member securely connecting the two link members. Therefore, when the two link members are caused to move alternately and inversely in upward and downward directions due to rolling of the cab body, the connecting member functions in such a way as to offset the upward and downward movements of the two link members. As a consequence, the link mechanism compensates for the rigidity of the second anti-vibrational mount against rolling movements, supporting the cab body in a stabilized state on the frame.

Moreover, the resilient bush, which is inserted at the joint of the link member with at least either the cab body or the support frame, can effectively damp transmission of vibrations of relatively high frequencies to the cab body through the link mechanism to reduce generation of resounding noises within the operator's cab.

We claim:

1. A working machine with an operator's cab, having a support frame, a cab body mounted on said support frame, and a cushioning support means provided between said cab body and said support frame to damp transmission of vibrations from said support frame to said cab body, said cushioning support means including at least two units of a first anti-vibrational mount located in laterally spaced positions under one of front or rear end portions of said cab body to support said cab body resiliently while attenuating vibrations thereof, and at least two units of a second anti-vibrational mount located in laterally spaced positions under the other of said front or rear end portions of said cab body to support said cab body resiliently while attenuating vibratins thereof, characterized in that:

said first anti-vibrational mount is located between said support frame and said cab body, and constituted by a liquid sealed-in type rubber mount internally containing a highly viscous liquid in a sealed state; and said second anti-vibrational mount is located between said support frame and said cab body, and constituted by a spring for resiliently supporting said cab body and an oil damper for attenuating vibrations of said cab body, said spring of said second anti-vibrational mount having a smaller spring constant than that of said first anti-vibrational mount.

2. A working machine with an operator's cab as defined in claim 1, wherein said first and second anti-vibrational mounts of said cushioning support means are located under rear and front end portions of said cab body, respectively.

3. A working machine with an opertor's cab as defined in claim 1, wherein said first and second anti-vibrational mounts of said cushioning support means are located under front and rear end portions of said cab body, respectively.

4. A working machine with an operator's cab as defined in any one of claims 1, 2 and 3, further comprising a link mechanism located in the vicinity of said second anti-vibrational mount, said link mechanism being rotatably connected at one end thereof to said cab body and at the other end to said support frame to restrict sideward or lateral vibrations of said cab body on said support frame.

5. A working machine with an operator's cab as defined in claim 4, wherein said link mechanism comprises a pair of link members located in laterally spaced positions between said cab body and said support frame and each having one end thereof connected to said cab body and the other end to said support frame, a connecting member transversely connected between said link members, and a resilient bush member inserted at the joint of each link member with at least either one of said cab body and said support frame.

6. A working machine with an operator's cab as defined in any one of claims 1, 2 and 3, wherein said first anti-vibrational mount is arranged to have a spring constant in the range of from $5\times10^5$ to $15\times10^5$ (N/m) and an attenuation coefficient in the range of from $1\times10^4$ to $2\times10^4$ (N·sec/m), while said spring of said second anti-vibrational mount is arranged to have a spring constant of said spring member in the range of from $4\times10^4$ to $10\times10^4$ (N/m), and an attenuation coefficient of said oil damper in the range of from $2\times10^3$ to $6\times10^3$ (N·sec/m).

* * * * *